June 20, 1967

R. P. BEMISS ETAL 3,325,969

HEAT SEALING APPARATUS

Filed May 12, 1964

INVENTORS
ROBERT P. BEMISS
WILLIAM W. HENSEN
BY
Allen and Chromy
ATTORNEYS

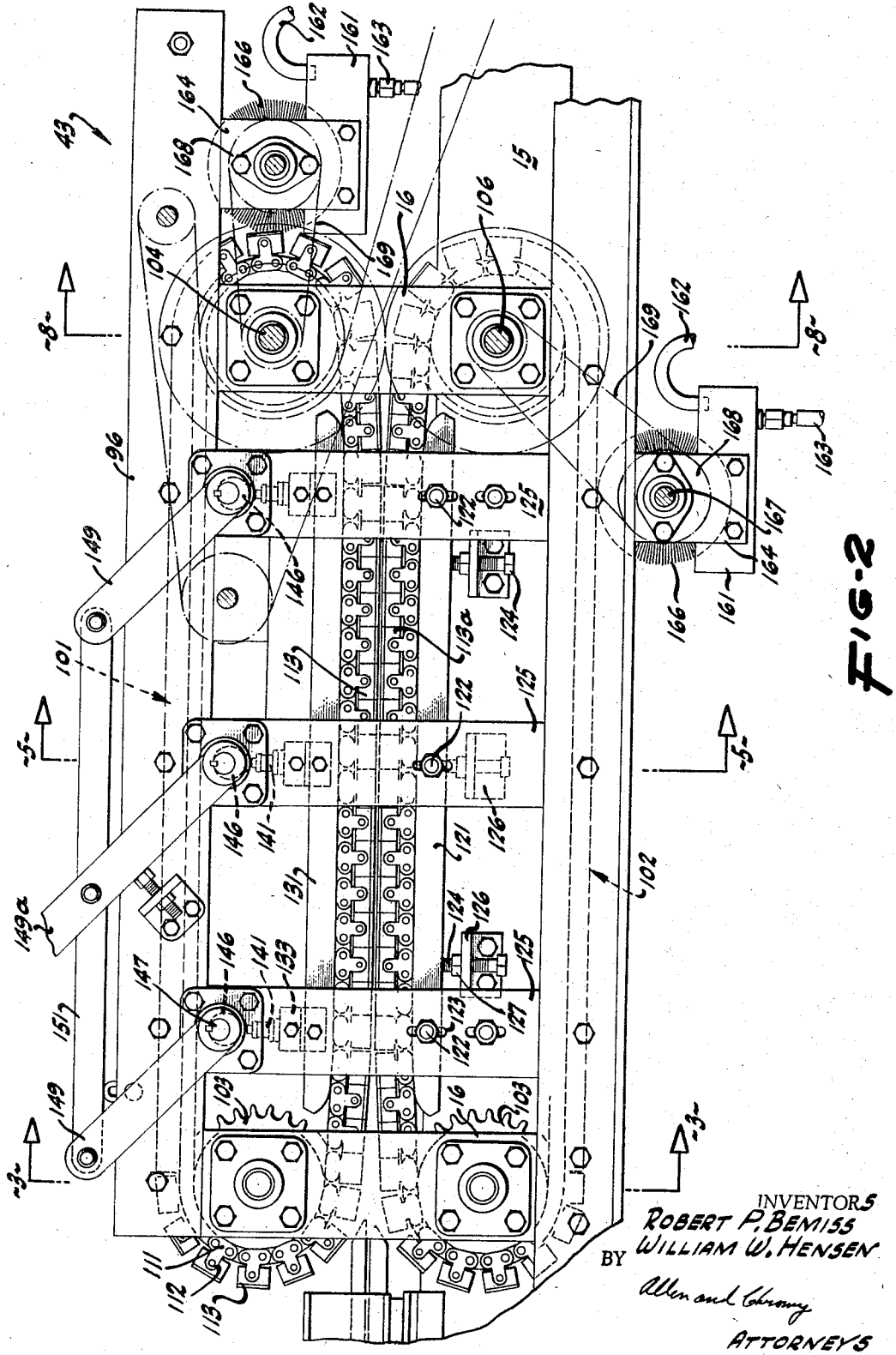

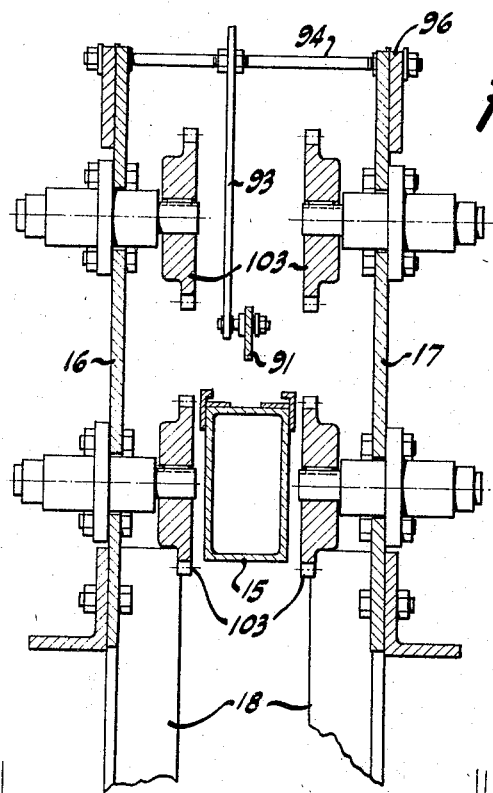
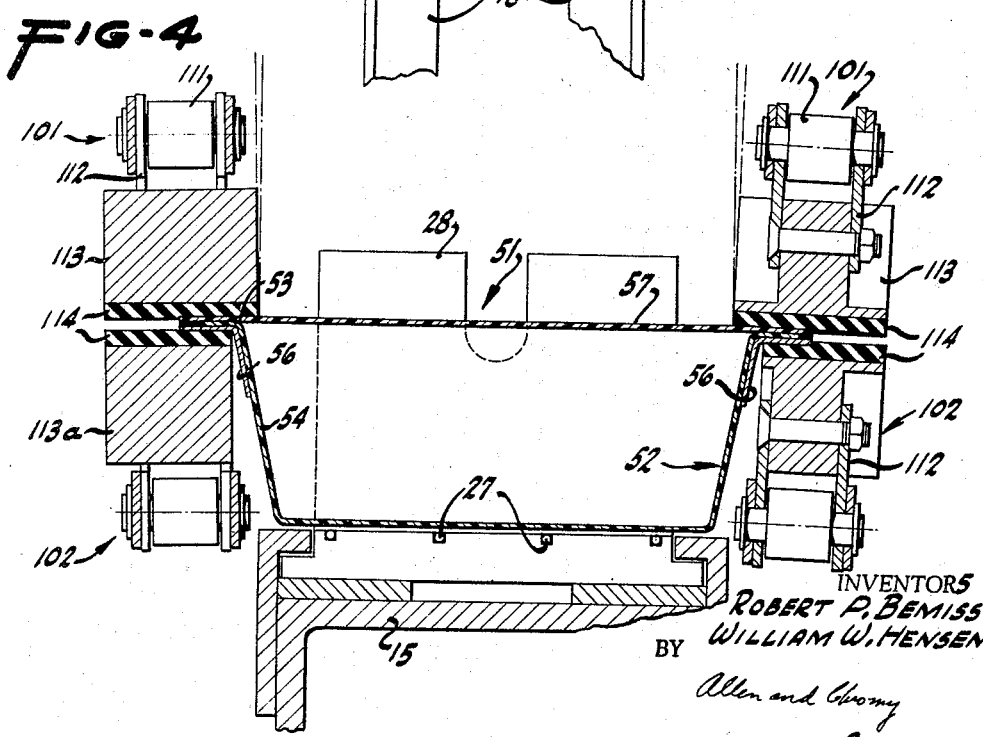

June 20, 1967 R. P. BEMISS ETAL 3,325,969
HEAT SEALING APPARATUS
Filed May 12, 1964 6 Sheets-Sheet 4

INVENTORS
ROBERT P. BEMISS
WILLIAM W. HENSEN
BY
Allen and Chromy
ATTORNEYS

INVENTORS
ROBERT P. BEMISS
WILLIAM W. HENSEN
BY
Allen and Chromy
ATTORNEYS

United States Patent Office 3,325,969
Patented June 20, 1967

3,325,969
HEAT SEALING APPARATUS
Robert P. Bemiss, Hillsborough, and William W. Hensen, Contra Costa, Calif., assignors to Robalex, Inc., San Francisco, Calif., a corporation of California
Filed May 12, 1964, Ser. No. 366,735
15 Claims. (Cl. 53—329)

The present invention relates to apparatus for effecting a hermetic seal of a lid on a box and is concerned more particularly with improved apparatus for providing a hermetic seal between a rectangular box and lid in two successive steps, where two opposite heat-sealed strips are provided between the edges of the box and the similar edges of the plastic or plastic-coated cover and then the box and cover are turned through 90° and the other two edges of the box and the cover are similarly strip-sealed to overlap the seals of the first two edges.

It is the general object of the invention to provide apparatus for effecting a heat seal between a plastic box and a plastic or plastic-coated cover therefor.

It is a further object of the invention to provide apparatus for effecting a heat seal between a plastic box and a plastic-coated cover therefor where the box and the cover are of a generally rectangular configuration so as to involve strip sealing around the edges thereof.

It is another object of the invention to provide a sealing apparatus of the above character wherein the box is first carried through a preliminary heating means to condition it for sealing and is thereafter subjected to endless pressure elements to effect the seal between the lid and the box.

Still another object of the invention is to provide a sealing apparatus of the above character wherein the endless pressure elements are in the form of endless track-type pressure pads with their edges in substantial continuous engagement.

A further object of the invention is to provide a sealing apparatus in which a box and its cover are carried through a preliminary heating means and then through pressure means for effecting the seal in which the positions of the box and the cover are maintained during the transfer from the preliminary heating means to the pressure-sealing means.

It is a further object of the invention to provide sealing apparatus wherein a plastic box is supported and maintained in aligned relation in part by the pressure elements during the sealing step.

It is a further object of the invention to provide sealing apparatus including track-type sealing elements wherein the cover or lid for the box is maintained in a desired relation and the desired shape during the sealing operation.

Still another object of the invention is to provide upper and lower pressure elements for effecting a seal wherein the spacing between these elements can be adjusted to the thickness of the material to be sealed and wherein the pressure from above is applied by a floating pressure element.

Other objects of advantage of this invention will be apparent from the following description of a preferred embodiment thereof, taken in connection with the accompanying drawings in which:

FIGS. 1A and 1B are two sections of a side elevation of the sealing apparatus.

FIG. 2 is an enlarged elevation of one pair of the endless track-type sealing elements.

FIG. 3 is a sectional view taken as indicated by the line 3—3 in FIG. 2, with the pressure elements omitted.

FIG. 4 is a sectional view through the engaged pairs of pressure elements showing their relation to the plastic box and its cover or lid.

Figure 10:
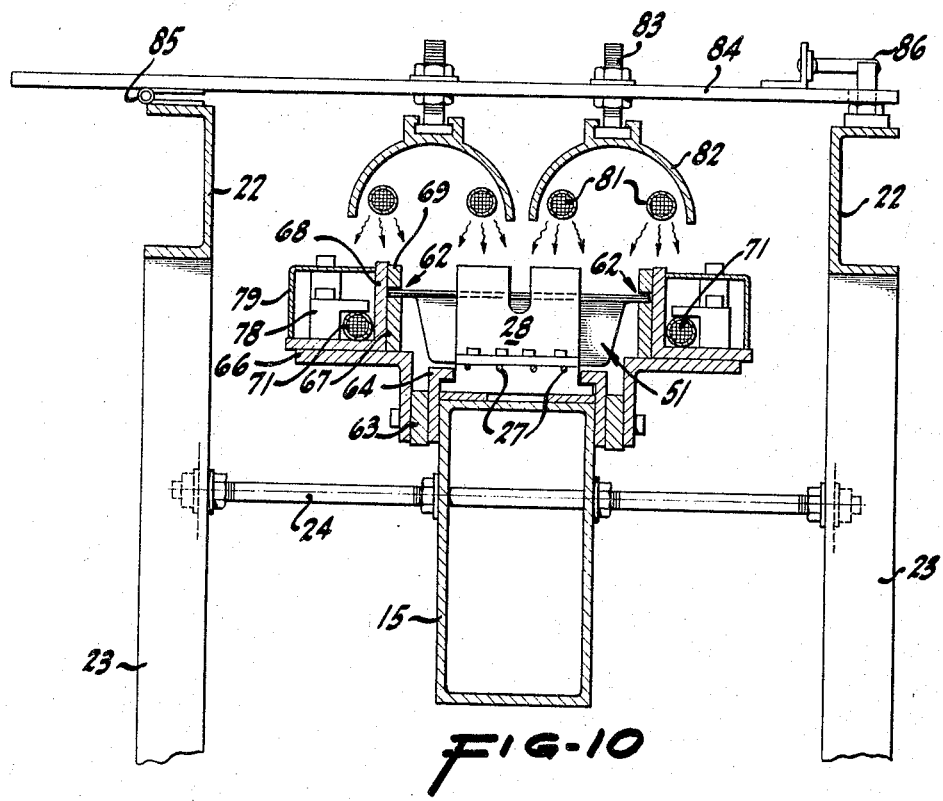
FIG. 10 is a transverse sectional view taken as indicated by the line 10—10 in FIG. 1A.

In general, the apparatus of the instant invention carries out the process disclosed in the co-pending application of Robert P. Bemiss, Ser. No. 366,877 filed May 12, 1964 for Heat-Sealing Methods. Referring to FIGS. 1A, 1B, 2 and 3, the apparatus includes a frame comprising a central box frame member 15 which extends from end to end of the apparatus and respective side plates 16 and 17 connected thereto and which have legs 18. Certain auxiliary frame channels 22 are provided intermediate the length of the main box frame 15 supported by suitable legs 23, and these auxiliary support legs 23 are attached and spaced from the box frame by suitable tie rods 24 (FIG. 10).

At the feed end of the apparatus, there is provided an idler sprocket 26 over which is stretched a conveyor of wires 27 having suitable propelling angles or flights 28 secured thereon on transverse teeth 29 which engage suitable seats 31 in the sprocket 26. At the discharge end of the apparatus a similar driving sprocket 32 is mounted in an auxiliary frame 33 and is driven through suitable chain and sprocket means 34, 35, 36 and 37 from a motor 38. This conveyor is the type disclosed in the co-pending application of Wolfgang B. Fahrenbach, Ser. No. 354,869 filed Mar. 26, 1964 for Conveyor.

In general, the conveyor 27 (FIGS. 1A and 1B) travels along the linear path which leads from a feed station 41 through a pre-heating station 42, a pressure-sealing station 43, a carton turning station 44, a second pre-heating station 45 (FIG. 1B) and then a second pressure-sealing station 46, to a point of discharge at 47. Because the two pre-heating stations 42 and 45 and the two pressure sealing stations 43 and 46 are identical in construction, only one of each will be described.

The plastic package (FIGS. 1A and 4) comprises a bottom container or tray 52 which is formed of suitable plastic material (such as polystyrene, for example) and terminates at its upper end in a horizontal lip 53, projecting out on all sides of the rectangular tray. Adjacent the lip 53 and the inclined sidewalls 54 of the tray, there is provided a reinforcing collar 56 of paper, cardboard or other similar material which is angle-shaped to conform to the walls 54 and 53 of the tray and is suitably secured thereto by an adhesive or a plastic seal. The package 51 also includes a cover or a lid 57 which in the present case is in the form of a cardboard rectangle having a plastic coating on its bottom surface and a suitable varnish or other coating on its top surface. The dimensions of the cover 57 correspond in all particulars to the dimensions and the rectangular shape of the side edges or lip 53 of the tray. While this particular package is shown in connection with the apparatus, it is obvious the apparatus can be used with other types of packages and that this is only illustrative. Also, while the package is stated to be made of polystyrene, it can also be made of various other plastic materials commonly used in the packaging industry.

It will be understood that at the feed station 41 the filled trays 51 are placed in front of each one of the angles or pushers 28, automatically or manually, and a cover 57 is placed over the tray in properly aligned position so as to be presented to the entrance end 61 of a pair of opposed tracks 62 (FIGS. 1A and 10). These tracks are mounted on the box frame 15 (as shown in FIG. 10) and comprise a spacing bar 63 and an angle 64 whose upper flange faces inwardly and serves as a guide for the teeth 28 of the conveyor. The track 62 also includes an angle 66 having a horizontal flange which projects outwardly and has supported thereon a bar 67 secured to an angle 68 which also carries an upper bar 69 spaced from the lower bar 67 so as to provide a slot therebetween which guides edge of the lip 53 of the carton, and the side of the lid engaged with this lip.

Heating means are supplied for the track, and in the form of the invention shown, these may take the form of "Calrod" heaters 71 (FIG. 10) which is secured in place by a plurality of clamps 78 on the horizontal leg of the angle 68. A suitable cover 79 (FIGS. 1A and 10) is provided to form an enclosed heating space and to heat the supporting rail 67 for the bottom edge of the carton, and the overlying rail 69 lying above the edge of the lid. Overhead heat is also provided by a pair of "Calrod" heaters 81 suitably mounted in a reflector 82 which is adjustably carried by a screw 83 on a transverse support bar 84 which is hinged to the left-hand channel 22 at 85 and removably attached to the right-hand channel 22 by means of a suitable connection 86. This enables the heaters to be swung out of the way when access is desired to the apparatus lying underneath.

It will be seen, therefore, that two linear zones of heat are provided along the conveyor in the pre-heating zone of the apparatus and the heat supplied is regulated with respect to the time of the travel of the tray or box and the lid going therethrough so as to raise the contacting surface of the lip 53 and the lid 57 lying in the slots between the bar 67 and 69 to a heat sealing temperature and to condition the plastic of the lid and the tray for heat sealing when pressure is applied.

Figure 9:
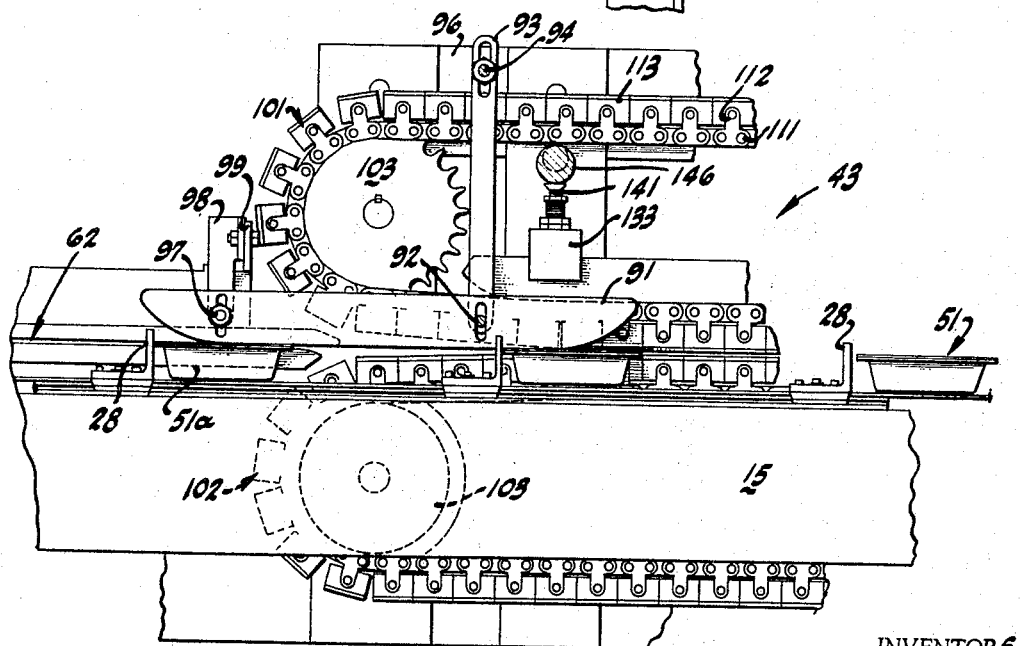
FIG. 9 is a fragmentary elevational view with certain parts omitted and illustrating the relation of the transfer bar in controlling the carton and the lid during transfer from the preliminary guide track elements to the pressure elements.

As seen in FIGS. 2 and 9, when a tray such as the tray 51a in FIG. 9 approaches the end of the track 62, it is engaged by a floating pressure bar 91 (FIGS. 3 and 9) which is slotted to engage a pin 92, carried by a guide link 93 which is slotted to engage over a rod 94 extending between side frame members 96. Adjacent its left-hand end, the pressure bar 91 (FIG. 9) is slotted to be engaged by a pin 97 carried by a support link 98 which is supported on a transverse plate 99 of the frame. It will be seen that the pressure transfer bar 91 engages the top of the lid 57 and by frictional resistance urges it back against the adjacent flight 28 of the conveyor so that it tends to remain in engaged position with the tray 51. The respective opposite side edges of the tray 51 are adjacent the vertically divergent feed ends of the respective pairs of endless track-type pressure elements 101 and 102 which are trained about respective idler sprockets 103 (FIGS. 2 and 9). Suitable drive sprockets at the discharge end of the pressure elements are carried by respective shafts 104 and 106.

Figure 6:
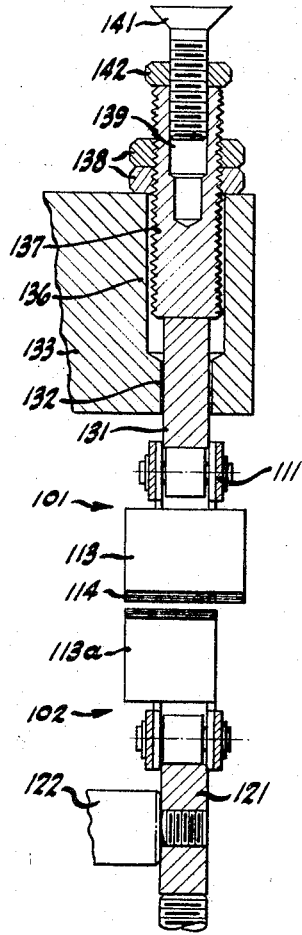
FIG. 6 is an enlarged view of a portion of FIG. 5.
Figure 7:
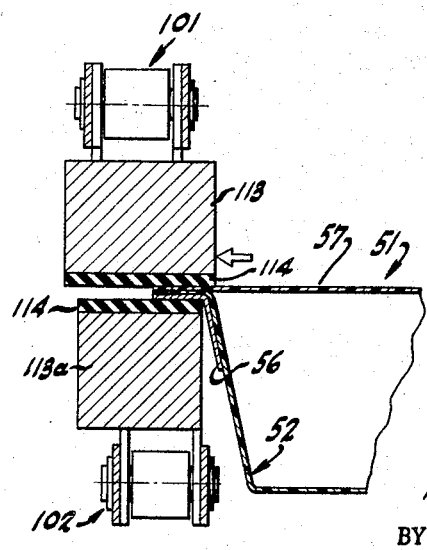
FIG. 7 is an enlarged fragmentary sectional view showing the effect of the divergence of the upper pressure elements of the opposite pair of elements in maintaining the lid tight.
Figure 8:
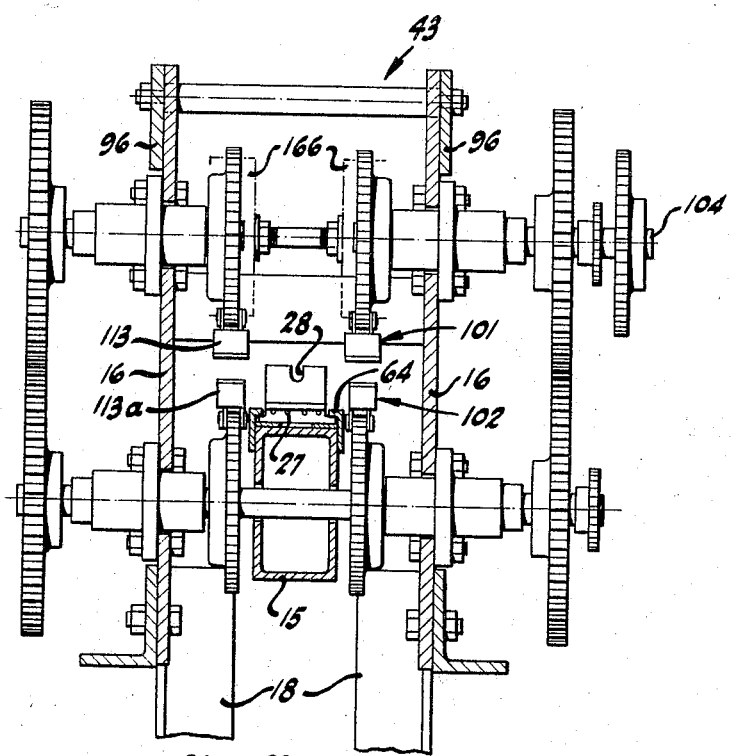
FIG. 8 is a transverse sectional view with certain parts shown in elevation, the view being taken as indicated by the line 8—8 in FIG. 2.

The endless track elements 101 and 102 (FIGS. 2 and 9) each comprise a chain 111 of conventional construction having on alternate links an outwardly projecting ear 112 in which is pivoted a metal block 113 (FIG. 6) extending between the opposite chains of a pair, and each metal block has a resilient pressure face 114 bonded thereto. The resilient face is preferably formed of a heat-resistant type of material such as a "Hycar" rubber. The blocks 113 are so dimensioned with respect to their support links that in a straight portion or stretch of the chain these blocks 113 are in substantial abutting relation so as to present a substantially continuous pressure face at each one of the endless pressure elements 101 and 102. The construction of the elements 101 and 102 are identical except as to the width of the blocks 113 of the upper pressure element to 101 and the lower blocks 113a of the lower pressure element 102. These blocks 113a are narrower than the blocks 113, which project inwardly to a greater extent to overlie and brace a tray as seen in FIGS. 4 and 7. The projection of the upper blocks 113 over the lid and the tray or box serve to provide an additional pressure and control area with respect to the lid as compared with the tray and, preferably, these upper blocks 113 are disposed in inclined fashion to place their inner edges which overlap the box and the lid slightly lower than the outer edges so as to insure an effective pressure condition during the sealing of the lid to the edge of the tray. The tilting of the blocks 113 and the divergence of the two series of blocks 113 is effected, respectively, by tilting and spacing apart of the two roller sprockets 103 for the chain 111.

The mounting of the upper pressure elements 101 at the two opposite sides of the tray is such as to be divergent from the feed end of the pressure elements to the discharge end thereof (for example, the difference in position laterally of the upper blocks 113 in FIGS. 4 and 7). In FIG. 4 adjacent the feed end of the pressure elements, the block 113 is projecting to its fullest extent inwardly with respect to block 113 and the tray. As a block 113 travels towards the discharge end, and while the pressure seal is being effected, it slides with reference to the cover 57 on either side thereof so as to maintain the cover stretched tight and in proper condition to effect the seal and to present an attractive filled tray thereafter.

Preferably, this linear speed of travel of the pressure elements 101 and 102 is slightly faster than the conveyor flights 28 so that the trays are slightly spaced ahead of these flights during the heat-sealing operation so as not to be influenced by movement of the conveyor and the flights thereof.

To control the position of the upper stretch of the lower pressure element 102, there is provided a support bar 121 (FIGS. 2, 5 and 6) upon which the chain rides. This support bar 121 carries guide pins, 122 each engaging a slot 123 in a vertical side plate 125. The bar 121 rests on a plurality of threaded adjusting studs 124, each of which is threadedly engaged with a support angle 126 and carries a locking nut 127. The adjustment of the two adjusting screws 124 is to provide the proper spacing between the upper and lower pressure elements for the thickness dimension of the edge of the tray and the lid to be applied thereto.

The upper endless pressure elements have their lower stretches guided by respective releasable upper pressure bars 131 which rest on the lower stretch of the upper pressure element 101 and are guided (FIGS. 2, 5 and 6) in slots 132 in guide blocks 133 which are suitably bolted to the upright side plate members 125. Each of the blocks 133 (FIG. 6) have a clearance aperture 136 for a threaded pressure screw 137 having a pair of stop nuts 138 threaded thereon and normally resting against the upper face of each block 133. Each pressure screw 137 has a threaded interior 139 to receive a pressure screw 141 which is locked in position with respect thereto by a lock nut 142. Each of these pressure screws 141 has its upper face in abutting relation with an eccentric 146 having its ends 147 journaled in suitable bearing blocks on the upright members 125. One of the ends 147 of each of the eccentrics 146 projects outside of the bearing block 148 has an arm 149 secured thereto. These arms, as seen in FIG. 2, are connected by a link 151 which is pivotally connected to each arm, and one of these links 149a extends upwardly and provides an operating handle for simultaneous movement of the eccentrics 146 in their engagement with the pressure screws 141 and transmitting through screws 137 a pressure to the upper pressure link 132, the extent of this pressure being controlled by the respective sets of lock nuts 138 and 142. Therefore, while operating the links 149 and 149a clockwise from the position shown in FIG. 2, the pressure of the upper pressure bar 131 can be released.

Figure 5:
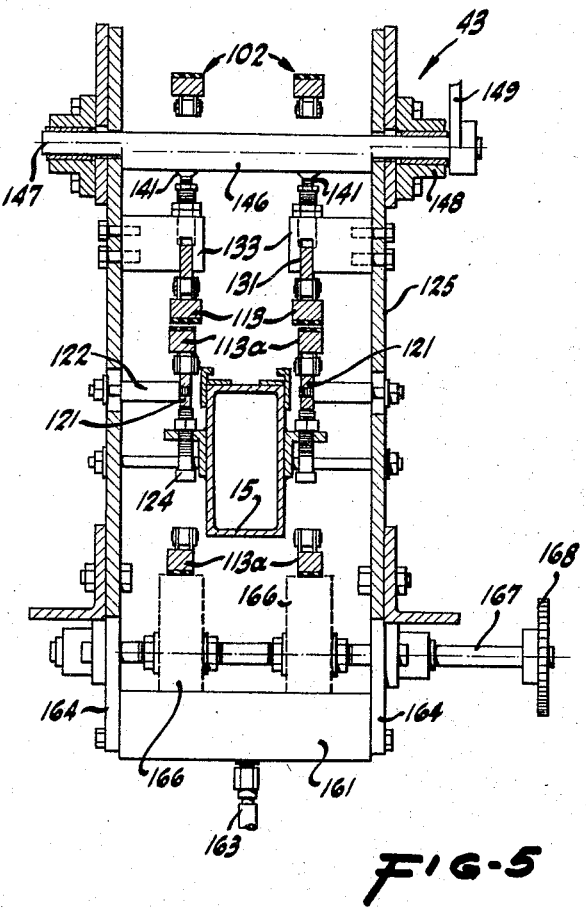
FIG. 5 is a transverse sectional view taken as indicated by the line 5—5 in FIG. 2.

Means is provided for cleaning the lower pressure element 102 continuously to avoid build-up of undesirable material as, for example, spilled fresh strawberries. For that purpose, a tray 161 is mounted beneath the lower pressure elements 102, as seen in FIGS. 2 and 5, and this tray 161 is provided with a suitable cleaning solution which may be recirculated by means of an inlet pipe 162 and an outlet pipe 163 in any desired fashion. Each tray is secured between supporting plates 164 carried by the frame and have dipping into them a pair of brushes 166, one for each of the lower pressure elements 102, which engage the idle stretch of these pressure elements continuously to clean off the outer pressure pads. The supporting shaft 167 for the pair of brushes carries a sprocket 168 connected by a drive chain 169 to a suitable sprocket on the shaft 106. A similar cleaning mechanism is provided for the upper pressure elements 101, as viewed at the upper right of FIG. 2. As it is similar in construction and operation to the cleaning elements previously described, no further description thereof is thought necessary.

Figure 11:
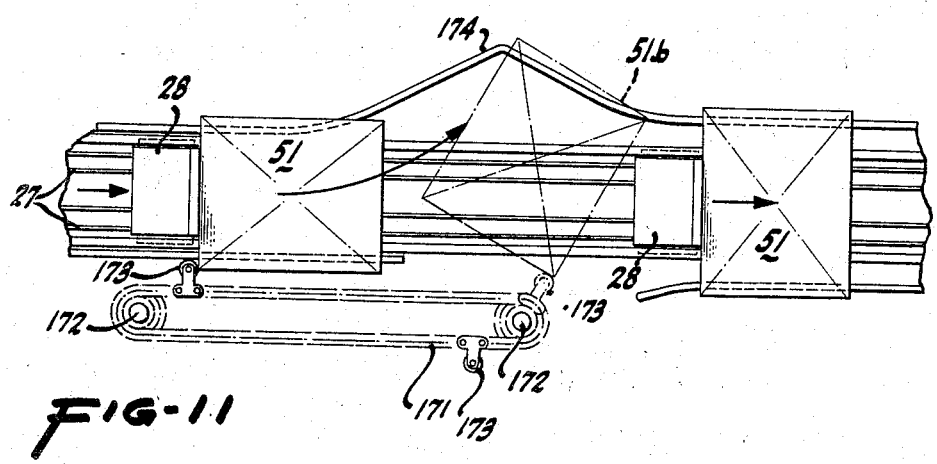
FIG. 11 is a fragmentary plan view taken as indicated by the line 11—11 in FIG. 1A.

Between the respective sets of pressure elements shown in FIGS. 1A and 1B, a ninety degree turn device is provided for placing a box so that its sealed edges extend transversely of the conveyor and for placing the unsealed edges in proper position for sealing. Referring to FIGS. 1A and 11, a conveyor flight 28, in carrying a box 51 between the two heat sealing units, carries into a portion of the conveyor path, where an auxiliary propelling chain 171 is provided parallel to the path of the conveyor flight 28 and mounted on sprockets on upright shafts 172. This conveyor 171 is of general construction as shown in the connection with the pressure element 101, and its links include projections carrying respective rollers 173 which are in timed relation to engage behind a tray 51 and start turning it in a counter-clockwise direction, as seen at the dotted position 51b. A V-shaped guide and turn track 174 is provided on the side of the path of the flight opposite to conveyor 171 to retard a corner of the carton. The roller 173 substantially completes the turning of the carton, traveling at a faster speed than the flight 28 as the carton turns substantially ninety degrees and moves ahead of the flight so that the flight 28, as it catches up with the carton, will complete the turning operation. As seen in FIG. 11, for example, the narrow width of the tray is then disposed transversely of the path of flights 28 and, after turning, the longer dimension of the tray 51 is disposed transversely.

Thereafter, the tray 51 and its lid are carried through a second sealing operation on wider tracks and spacing correspondingly to complete the seal including the overlapping seal at respective corners of the tray and its lid.

The operation of the apparatus can be briefly described as follows. The respective trays with their lids are fed into operative position with respect to the succeeding flights 28, as seen at the left of FIG. 1A, and are carried by these flights into engagement with respective tracks and preheating elements 62. As seen in FIG. 10, the upper part of the lid is exposed to radiant heat from the heater 81. The time the trays with their lids are exposed to this preheating is determined so that they arrive at the pressure station 43 with the lid and the adjacent surface of the tray 51 properly conditioned for a heat sealing operation, and they are guided during their transfer from the preliminary preheating station into engagement with the first set of pressure elements 101 and 102 by the transfer bar 91 (FIGS. 2 and 9), this transfer bar maintaining the tray and lid in the proper position and in contact with the flight 28 which is propelling it. The respective pressure elements 101 and 102 are guided as they come into engagement with each other by the cam ends of the respective pressure bars 121 and 131 so that they engage the lid and the edge of the tray in substantially parallel fashion and subject the heated plastic of the tray and of the lid to a pressure sealing operation during the time they are traveling through the engaged opposed stretches of the respective pressure elements 101 and 102. Subsequently, each tray and lid is turned through ninety degrees and is again subjected to another preheating operation and a subsequent pressure sealing operation to complete the seal, and then it is discharged from the machine.

While we have shown and described a preferred embodiment of the invention, it is apparent that the invention is capable of variation and modification from the forms shown, so that the scope thereof should be limited only by the scope of the claims appended hereto.

What we claim is:

1. Apparatus for effecting a seal between a plastic container or box and a plastic or plastic-coated lid therefor, comprising an endless conveyor disposed to travel along a linear path and having container receiving and progressing stations thereon, a first set of guide tracks disposed in opposed parallel relation along said path for receiving the box and the lid and for guiding their travel along said path, first heating means extending along said first set of guide tracks for applying heat to the containers being carried therethrough, a first conveying means including respective parallel pairs of upper and lower pressure-applying elements traveling along said path and disposed to receive the boxes and the lids from said conveyor after passing along said first set of guide tracks and to apply pressure to effect a seal between two opposite edges of the box and the two corresponding edges of the lid, means for driving said conveying means at a faster speed than said conveyor to move a box out of progressing relation with its associated station, means for receiving boxes and lids thereon from said heat sealing elements including means for effecting a 90 degree rotation of the box, a second set of guide tracks receiving boxes from said last-mentioned means, second heating means along said second set of guide tracks for the containers being carried by the conveyor, said conveyor again having a box progressing station in progressing relation with its associated box while passing through said second set of guide tracks, and a second conveying means including a second set of parallel pairs of pressure-applying elements disposed to receive the containers from said second set of guide tracks and to seal the two other sets of edges of the container and the lid to complete the seal.

2. Apparatus for effecting a seal between a plastic box and a plastic or plastic-coated lid therefor, comprising an endless conveyor disposed to travel along a linear path and having article receiving and progressing stations thereon, a first set of heat-conducting guide tracks disposed in opposed parallel relation along said path for receiving the box and the lid and for guiding their travel along said path, heating means extending along said first set of guide tracks for applying heat to the articles being carried therethrough, a first conveying means including respective parallel pairs of endless upper and lower series of pressure-applying track-type blocks traveling along said path and disposed to receive the boxes and the lids from said first set of guide tracks and to apply pressure to effect the seal between two opposite edges of the box and the two coresponding edges of the lid, means for driving said conveying means at a faster speed than said conveyor to move a box out of progressing relation with its associated station, means for receiving boxes and lids thereon from said heat-sealing elements, including means for effecting a 90° rotation of the box, a second set of guide tracks for the articles being carried by the conveyor, a second heating means extending along said second set of guide tracks for applying heat to the articles being carried therethrough, said conveyor again having a box progressing station in progressing relation with its associated box while passing through said second set of guide tracks, and a second conveying means including a second set of parallel pairs of endless series of pressure-applying track-type blocks disposed to receive the boxes from said second set of guide tracks and to seal the two other sets of edges of the box and the lid to complete the seal.

3. Apparatus for effecting a seal between a plastic box and a plastic or plastic-coated lid therefor, comprising an endless conveyor disposed to travel along a linear path and having article receiving and progressing stations thereon, a set of guide tracks disposed in opposed parallel relation along said path for receiving the box and the lid and for guiding their travel along said path, heating means extending along said set of guide tracks for applying heat to the articles being carried thereto, and conveying means including respective spaced-apart pairs of opposed upper and lower series of pressure applying track-type blocks traveling along said path to receive the boxes and the lids from said set of guide tracks to effect a seal between the edges of the box and the corresponding edges of the lid, and means for driving said conveying means at a faster speed than said conveyor to move a box out of progressing relation with the associated station.

4. Apparatus for heat-sealing plastic boxes and plastic or plastic-coated covers therefor as recited in claim 3, in which said set of guide tracks have slot means formed of metal for confining the projecting side edges of the box and the lid thereon to guide them into relation to be sealed while permitting free movement of the box with the lid along the tracks, and in which each station has propelling means to engage both the box and the lid to maintain the aligned relation thereof.

5. Apparatus for heat-sealing plastic boxes and plastic or plastic-coated covers therefor, as recited in claim 3, in which said set of guide tracks has slot means formed of heat-conducting material for guiding the respective projecting side edges of the box and the lid thereon, heating means in heat conducting relation with said slot means, and overhead heating means for said slot means and said lid.

6. Apparatus for effecting a seal between a plastic box, a plastic or plastic-coated lid therefor, comprising an endless conveyor disposed to travel along a linear path and having container receiving and progressing stations thereon, a set of guide tracks disposed in opposed parallel relation along said path for receiving the box and the lid and for guiding their travel along said path, heating means extending along said set of guide tracks for applying heat to the containers being carried therethrough, conveying means including respective spaced apart pairs of opposed upper and lower pressure applying elements traveling along a linear sealing path, each pair of upper and lower pressure applying elements being adapted to effect the seal between the edges of the box and corresponding edges of the lid, each of said pressure applying elements comprising an endless series of track-type block means disposed in substantially abutting relation while traveling along said linear path, means for driving said conveying means at a faster speed than said conveyor to move a box out of progressing relation with its associated station, and in which the entrance ends of the pairs of said upper and lower elements are disposed divergent to each other from the entrance end of the sealing elements to effect a stretching action on the box and the lid.

7. Apparatus for effecting a seal between a plastic box, a plastic or plastic-coated lid therefor, comprising an endless conveyor disposed to travel along a linear path and having container receiving and progressing stations thereon, a set of guide tracks disposed in opposed parallel relation along said path for receiving the box and the lid and for guiding their travel along said path, heating means extending along said set of guide tracks for applying heat to the containers being carried therethrough, conveying means including respective spaced apart pairs of opposed upper and lower pressure applying elements traveling along a linear sealing path, each pair of upper and lower pressure applying elements being adapted to effect the seal between the edges of the box and corresponding edges of the lid, each of said pressure applying elements comprising an endless series of track-type block means disposed in substantially abutting relation while traveling along said linear path, and means for driving said conveying means at a faster speed than said conveyor to move a box out of progressing relation with the associated station.

8. An apparatus, as recited in claim 7, in which the block means each include a pressure applying face of resilient material.

9. An apparatus as recited in claim 7, in which the pressure element of the upper tracks are wider inwardly to the box than the lower track-type elements so as to maintain the planar relation of the lid of the box.

10. A heat-sealing apparatus as recited in claim 7, in which the respective pairs of sealing elements to engage the opposite sides or edges of the box and the lid are divergent from the entrance end of the sealing elements to the exit end thereof to effect a stretching action on the box and the lid.

11. A heat-sealing apparatus as recited in claim 7, in which the respective pairs of endless sealing elements have the upper elements of each pair tilted slightly at the feed end to make their inner edges lowermost.

12. In a heat-sealing apparatus as recited in claim 7, in which the endless track-type pressure elements have respective upper and lower pressure bars engaging the chain supports of the respective track-type elements, means for mounting the lower pressure bars for vertical adjusting movement to accommodate a given combined dimension of the box porton and the lid to be grasped therebetween, and means for mounting the upper pressure bars for positioning selectively in active or inactive position.

13. In a heat-sealing apparatus as recited in claim 7, in which the heat-sealing or pressure blocks of each lower endless mechanism have their inner side edges disposed in engagement with the sides of the box to maintain its aligned relation during the heat-sealing operation.

14. In a heat-sealing apparatus as recited in claim 7, in which the width dimension of the pressure elements is at least twice as great as the width of the side edges of the box and the lid to be sealed to effect a stabilizing action during the heat-sealing operation.

15. In heat-sealing apparatus as recited in claim 7 in which cleaning means is provided for said conveying means, said cleaning means being disposed intermediate the discharge and entrance ends of said conveying means.

References Cited

UNITED STATES PATENTS

| | | | |
|---|---|---|---|
| 2,492,530 | 12/1949 | Kriegsheim. | |
| 2,982,073 | 5/1961 | Zimmerer | 53—373 X |
| 3,143,837 | 8/1964 | Barr | 53—373 |
| 3,221,473 | 12/1965 | Brown | 53—329 X |

TRAVIS S. McGEHEE, *Primary Examiner.*